US012573007B2

(12) United States Patent
Schilling et al.

(10) Patent No.: US 12,573,007 B2
(45) Date of Patent: Mar. 10, 2026

(54) METHOD FOR RECORDING A MERGED MICROSCOPE IMAGE, MICROSCOPE SYSTEM AND COMPUTER PROGRAM PRODUCT

(71) Applicant: EVIDENT Technology Center Europe GmbH, Münster (DE)

(72) Inventors: Tobias Schilling, Berlin (DE); Mathias Katzer, Altenberge (DE)

(73) Assignee: EVIDENT Technology Center Europe GmbH, Münster (DE)

( * ) Notice: Subject to any disclaimer, the term of this patent is extended or adjusted under 35 U.S.C. 154(b) by 0 days.

(21) Appl. No.: 18/625,768

(22) Filed: Apr. 3, 2024

(65) Prior Publication Data

US 2024/0331100 A1 Oct. 3, 2024

(30) Foreign Application Priority Data

Apr. 3, 2023 (DE) ..................... 10 2023 108 517.4

(51) Int. Cl.
    *G06T 5/50*         (2006.01)
    *G02B 21/26*      (2006.01)
            (Continued)

(52) U.S. Cl.
    CPC ............... *G06T 5/50* (2013.01); *G02B 21/26* (2013.01); *G02B 21/367* (2013.01); *H04N 23/56* (2023.01);
            (Continued)

(58) Field of Classification Search
    CPC ............. G06T 5/50; G06T 2207/10024; G06T 2207/10056; G06T 2207/10064;
            (Continued)

(56) References Cited

U.S. PATENT DOCUMENTS 8,310,532 B2   11/2012   Mertz
11,528,431 B2   12/2022   Amthor
          (Continued)

FOREIGN PATENT DOCUMENTS

CN       114004904 A     2/2022
CN       115291381 A    11/2022
          (Continued)

OTHER PUBLICATIONS

Search Report dated Sep. 29, 2023 for German Patent Application No. 10 2023 108 517.4.

(Continued)

*Primary Examiner* — Nasim N Nirjhar
(74) *Attorney, Agent, or Firm* — Fleit Intellectual Property Law; Paul D. Bianco

(57) ABSTRACT

A method for recording a merged microscope image of a sample includes a microscopic capturing of at least a first fused image and a second fused image. According to the method, there is capturing a first image in which the sample is illuminated in a structured manner; capturing a second image in which the sample is uniformly illuminated; fusing the first image and the second image; and merging the first fused image and the second fused image into the merged microscope image. The first image is used for low-frequency image information located in the focus and the second image is used for high-frequency image information located in the focus. The second fused image depicts a different position on the sample than the first fused image. A microscope system can be used with a computer program product to perform the method.

18 Claims, 3 Drawing Sheets

(51) Int. Cl.
  *G02B 21/36* (2006.01)
  *H04N 23/56* (2023.01)
(52) U.S. Cl.
  CPC .............. *G06T 2207/10024* (2013.01); *G06T 2207/10056* (2013.01); *G06T 2207/10064* (2013.01); *G06T 2207/10152* (2013.01); *G06T 2207/20221* (2013.01)
(58) Field of Classification Search
  CPC . G06T 2207/10152; G06T 2207/20221; G06T 3/4038; G06T 2200/32; G02B 21/26; G02B 21/367; G02B 21/06; G02B 21/361; H04N 23/56
  See application file for complete search history.

(56) References Cited

U.S. PATENT DOCUMENTS

| | | | |
|---|---|---|---|
| 2011/0109736 A1 | 5/2011 | Mertz | |
| 2012/0147224 A1 | 6/2012 | Takayama | |
| 2018/0074304 A1 | 3/2018 | Hernandez-Cubero | |
| 2018/0164563 A1 | 6/2018 | Fujii | |
| 2019/0302437 A1* | 10/2019 | Hillman | G02B 21/0032 |
| 2020/0218054 A1* | 7/2020 | Sase | H01J 37/26 |
| 2020/0342205 A1* | 10/2020 | Park | G01N 21/6458 |
| 2020/0371338 A1 | 11/2020 | Karanin | |
| 2023/0030424 A1* | 2/2023 | Ozcan | G06F 18/24137 |

FOREIGN PATENT DOCUMENTS

| | | |
|---|---|---|
| DE | 10 2005 032354 A1 | 1/2007 |
| DE | 10 2014 006717 A1 | 11/2015 |
| DE | 10 2017 107489 B3 | 7/2018 |
| DE | 10 2018 105308 A1 | 9/2019 |
| DE | 10 2019 131678 A1 | 5/2021 |
| JP | 2011523057 A | 8/2011 |
| JP | 2012138068 A | 7/2012 |
| JP | 201896760 A | 6/2018 |

OTHER PUBLICATIONS

Lim, Wide-field flourescence sectining with hybrid speckel and uniform-illumination microscopy, Optic Letters, vol. 33, No. 16, Aug. 15, 2008, p. 1819-1822.

Dupuis, Time-resolved wide-field optically sectioned flourescence microscopy, Article in Proceedings of SPIE, www.researchgate.net/publication/258812233, 2013, 8 pages.

Lim et al, Wide-field fourescence sectioning with hybrid speckle and inform-illumination microscopy; Nature Methods, Optics Letters, vol. 33: p. 1819-1821, Aug. 2008.

Jerome Mertz, Optical sectioning microscopy with planar or structured illumination, Nature Methods, vol. 8, p. 811-820 Oct. 2011.

Office Action dated Jun. 24, 2025 for Japanese Application No. 2024-059074.

\* cited by examiner

METHOD FOR RECORDING A MERGED MICROSCOPE IMAGE, MICROSCOPE SYSTEM AND COMPUTER PROGRAM PRODUCT

FIELD OF THE INVENTION

The invention relates to a method for recording a merged microscope image, a microscope system, and a computer program product.

BACKGROUND

A large number of different microscopes are known for a very wide range of applications. These can differ considerably in terms of the optical systems and their performance.

The disadvantage of microscopes is the very small image section that can be captured with a single image.

What the optical systems also generally have in common is that the depth of field of microscopic capturing is extremely shallow due to the laws of optics. This can lead to the fact that, although only a single focus plane is to be observed, the capturing of an image is disturbed by emissions that arise outside the focus plane and are then perceptible as blurred luminous phenomena on the captured image.

Various approaches to solving this problem are already known in the state of the art.

With a confocal microscope, only one part of the object to be captured is illuminated at a time. The sample is then scanned piece by piece. The reflected or fluorescent light from the sample is measured depending on its location, from which the entire sample is then constructed. A pinhole diaphragm is fitted in the beam path of the reflected or fluorescent light, which only allows light from the sharply imaged area to pass through. This effectively reduces the interfering influences of emissions from the layers outside the focal plane. The disadvantage of this setup is that it takes a long amount of time to create a single image by scanning the objects.

In the meantime, HiLo microscopy is also known as an alternative. The method is described, for example, in Lim et al, Optics Letters—33:1819-1821, 2008 and Jerome Mertz, Nature Methods—8:811-819 2011. The principle behind this capturing method is that two images are captured. In HiLo microscopy, a first image with so-called speckle illumination is de facto used as a filter, which depicts the low frequencies (Lo), and thus the background, in the image. The second image (Hi), which is created with Gaussian illumination, contains the image information that is in focus. By using the first image as a filter, the interfering emissions from the planes outside the focal plane can be eliminated.

SUMMARY OF THE INVENTION

It is an object of the present invention to at least partially eliminate the above disadvantages known from the prior art. In particular, it is an object of the present invention to provide a method for recording a merged microscope image, a microscope system and a computer program product which enable fast, cost-effective capturing with a particularly high optical quality, in particular image sharpness, with the largest possible image section, in particular of an entire sample, at the same time.

Accordingly, a method, a microscope system, and a computer program product are disclosed herein. Further features and details of the invention are also disclosed in the claims, this description, and the drawings. Features and details which are described in connection with the method according to the invention naturally also apply in connection with the microscope system according to the invention and/or the computer program product according to the invention and vice versa, so that reference is or can always be made to the individual aspects of the invention reciprocally with respect to the disclosure.

According to a first aspect of the invention, there is provided a method for recording a merged microscope image of a sample, comprising: microscopically capturing at least a first fused image and a second fused image, in particular by an optical capturing device:

a capturing of a first image, whereby the sample is illuminated in a structured manner, in particular by a structured illumination device, a capturing of a second image, the sample being uniformly illuminated, in particular by a Gaussian illumination device, and a fusion of the first image and the second image, whereby the first image is used for a low-frequency image information located in the focus by applying a low-pass filter and the second image is used for a high-frequency image information located in the focus by applying a high-pass filter, where the second fused image depicts a different position on the sample than the first fused image, and merging, in particular by the computing device, of the at least first fused image and the second fused image to form the merged microscope image.

The method steps/stages can be carried out at least partially simultaneously and/or sequentially, whereby the sequence of the method steps/stages is not limited by the specified sequence, so that individual steps/stages can be carried out in different sequences. Furthermore, individual or all steps/stages can be carried out repeatedly.

In the context of the invention, reference is made both to first and second images and to first and second fused images. The expressions first and second can only mean the number of images or fused images and not the sequence of capturing.

In particular, the method may be a computer-implemented method.

In the context of the invention, the recording of a microscope image can be understood as those measures which are necessary to obtain image information in the microscopic area of a sample.

A merged microscope image can be understood as a combination of several images with at least partially overlapping fields of view, whereby in particular a segmented panorama or a high-resolution image can be generated by merging.

It is conceivable that a definition of capturing parameters is provided. A capturing parameter can be configured at least as an area to be captured, resolution or color channel.

It may be provided that an area to be captured is defined, which results in the merged microscope image. It may be provided that the area to be captured is divided into fields of view at which the microscopic capturing takes place. The area to be captured can comprise at least one area in the z-direction, x-direction or y-direction. An area to be captured with an area in the z-direction, x-direction or y-direction can also be referred to as a block.

Furthermore, at least one definition of a resolution in at least the x, y or z-direction can be provided. In particular, the resolution in the z-direction can be specified as the number of planes of the xy-plane. This has the advantage that the user can easily recorded how many layers the merged image will comprise.

It may be provided that the area to be captured is divided into blocks, in particular based on a defined resolution. The size of the blocks can be defined in particular as a function of at least the number of fields of view, the number of xy-planes or a storage size of a storage of the microscope system.

Furthermore, at least one color channel can be defined. If more than one color channel is defined, it may be provided that the sequence of the color channels is defined during microscopic capturing. In particular, it may be provided that at least one exposure time or a filter depth can be defined individually for each color channel.

It is also conceivable that microscopic pre-capturing is provided. Pre-capturing can be understood to mean that a capturing is made according to defined capturing param- eters, but is limited at least in terms of the area to be captured, the resolution, filter depth or the calculation qual- ity compared to a microscopic capturing. This allows the user to quickly gain an overview of the effect of defining the capturing parameters without having to capture a complete image with a corresponding amount of time for each adjust- ment.

In principle, a sample can be any object that can be observed through the microscope used. In particular, the sample can be a biological sample and/or a medical sample, especially cells, tissue or organs. It may be provided that the sample is arranged on an object holder. An object holder can hold one or more samples.

In the context of the invention, microscopic capturing can be understood as generating an image containing informa- tion on the microscopic scale of a sample with the aid of a capturing device.

A fused image can comprise information from at least two microscopic capturings. In particular, the fused images can be captured at the same position on the sample.

The second image contains both blurred and sharp con- tent. Blurred content essentially contains components with a low local frequency. To discard the blurred image informa- tion, a high-pass filter can be applied to the second image. The high-pass filter can be configured in such a way that only the high spatial frequency components are selected and the low frequency components are excluded.

In the first image, the structured illumination means that the contrast of the imaged modulation is negligible for object signals that arise outside the focus. This means that a measure of the local contrast of the imaged modulation is a measure of the extent to which the object is in focus.

A measurement of the local modulation contrast of the first image may be provided. The measurement of the modulation contrast of the first image may be performed at least as a measurement of the local variance, single sideband demodulation or dual sideband demodulation. The measure- ment of the local modulation contrast may be coarse- grained.

It may be provided that a low-frequency image informa- tion derived from the first image is configured in such a way that a high-frequency image information derived from the second image is supplemented. The fusion of the high- frequency and low-frequency image content results in a fully resolved, sharp image that contains all frequency content within the frequency bandwidth of the microscope system. This essentially corresponds to the HiLo microscopy approach.

Structured illumination can be understood as illumination that is configured to generate an emission from the sample as a reaction to the illumination, mainly in the focal plane. In particular, the intensity of the structured illumination can vary depending on the location. The variation in intensity can be generated by a diffuser through which a light source, especially a coherent light source, shines.

Uniform illumination (also known as Gaussian illumina- tion) can be defined as illumination that essentially exposes the image area to be captured with uniform intensity. Inho- mogeneities, which inevitably occur due to the properties of the light source and the optical system, always occur to a certain extent even with uniform illumination. It may be provided that the uniform illumination is provided by a rotating diffuser through which a light source, in particular a coherent light source, shines. It is particularly advanta- geous for the diffuser to be the same diffuser that is used to provide the structured illumination, whereby it is stationary when the structured illumination is provided. It is then possible to switch between structured and homogeneous illumination by stopping or rotating the diffuser.

Furthermore, it may be provided that the sequence of the capturing of the first and second images is configured in such a way that a first image is followed by a further first image after a shift of the position on the sample. It may also be provided that a second image is followed by a further first image after a shift in position on the sample. This offers the advantage that the capturing mode of the capturing device does not have to be changed for each capturing, which enables even faster capturings.

The merging (also called stitching) of the fused images can be understood as a combination of the image informa- tion contained in the fused images. It may be provided that the fused images at least partially overlap, whereby, in particular when the images are merged, at least the overlap- ping areas are identified, the images are aligned or their appearance is adjusted, in particular with regard to at least brightness, color or contrast.

A different position on the sample can mean that the first fused image and the second fused image have at least one area that is not contained in both images. In other words, this means that the two images may be captured at different locations. It may be provided that the microscopic capturing and merging is carried out several times, in particular once for a predefined area, in particular a block, of an image. A block can have one or more images in xy-positions and xy-planes. It may be provided that merging is initially performed using a single pair of fused images from the first and further block using a fused image with the highest contrast, whereby the further fused images are merged using this ratio. This allows image errors to be minimized by the merging process.

It may be provided that the method comprises at least one of the following steps/stages, in particular in the sequence indicated:

Moving at least the sample or the lens to a first block. Microscopic capturing for a first xy-plane of the block, wherein a first and second image are captured and fused, microscopic capturing of a next xy-plane of the first block, wherein a first and second image are captured and fused until all xy-planes of the first block are microscopically captured. Repeat the microscopic capturing of the first block for one or more further color channels. Intermediate storage of all fused images of all xy-planes of the first block.

Moving at least the sample or the lens to a further block. Microscopically capturing a first xy-plane of the further block, whereby a first and second image are captured and fused, microscopically capturing a next xy-plane of the further block, whereby a first and second image are captured and fused until all xy-planes of the block have been micro- scopically captured. Repeat the microscopic capturing of the next block for one or more further color channels. Intermediate storage of all fused images of all xy-planes of the further block.

The fused image of the xy-plane with the highest contrast, in particular in the first color channel, of the first block is merged with the fused image of the second block from the same xy-plane. The "same xy-plane" can refer in particular to the at least partially overlapping image content. Alternatively or in addition, the same position in the z-direction in relation to at least the lens or the sample can also be meant. All further fused images of the first block are also merged according to the relation of the first merged image.

Then at least the sample or the lens can be moved to the next block and the steps/stages are repeated. The merged images of the blocks can be combined with each other to create a merged microscope image of the sample.

Overall, the advantage of the method according to the invention is that a fast, cost-effective capturing with a particularly high optical quality, in particular image sharpness, is made possible with the largest possible image section, in particular an entire sample. The fusion of the first and second images means that images can be created very quickly in which the image information from the planes that are not in the focus of the lens can be discarded, thereby increasing the sharpness of the image. As this method does not require the image to be scanned, but only two images to be captured, it is particularly fast compared to scanning the image as with a confocal microscope. By merging at least two, in particular several fused images, the speed of the capturing can be used to string together several images and thus generate images with a particularly large amount of information, for example segmented panoramas or high-resolution images with a large depth of field.

Within the scope of the invention, it is also conceivable that the structured illumination is configured at least as speckle illumination, periodic grid or checkerboard pattern when capturing the first image.

Speckle illumination can be configured to generate scattered points of light. Speckles can be understood as individual, point-like locations on the sample where the intensity of the illumination is high in relation to the rest of the sample. Speckles can be generated by interference. A monochromatic coherent light source in combination with a diffuser can be provided for this purpose.

The advantage of speckle illumination is that the intensity of the backscattered light outside the focal plane decreases significantly and therefore a particularly sharp fused image can be produced.

Periodic grids or checkerboard patterns can also be provided with the aid of interference-generating optical elements.

Furthermore, in a method according to the invention, it may advantageously be provided that the illumination during capturing of the first and second image is configured as fluorescence illumination, in particular with at least two color channels.

In other words, the first and second image can be a fluorescence image, in particular a multi-channel fluorescence image. Fluorescence images suffer particularly from emissions that do not originate from the focal plane, as these produce a kind of bokeh effect, which can blur otherwise sharp structures against the rather dark background. Therefore, a method according to the invention in combination with fluorescence illumination is particularly advantageous.

Furthermore, in a method according to the invention, it is conceivable that the first and second image is captured with at least a first and a second color channel, whereby in particular the sample is first illuminated in a structured and homogeneous manner with the first color channel and then the sample is illuminated in a structured and homogeneous manner with the second color channel. It can be particularly advantageous that when capturing several color channels, the illumination for the first or second image always starts with the illumination with which the capturing of the previous color channel ended. With three color channels red, green and blue, for example, this would result in the following sequence: red structured, red uniform, green uniform, green structured, blue structured, blue uniform. This means that the diffuser does not have to be accelerated and decelerated as often, saving time for the capturing on the one hand and reducing interference in the form of vibrations on the other.

In the case of several color channels and microscopic capturing in several xy-planes, it is possible that a microscopic capturing is first made for each xy-plane for each color channel before switching to the next xy-plane. This has the advantage that a particularly high image quality can be achieved when the individual channels are combined, as these were captured without the sample or the lens being moved. It can also be provided that the xy-planes are each traversed with a single color channel.

Furthermore, in a method according to the invention, it may advantageously be provided that the position on the sample differs at least in a z-direction of the sample, an x-direction of the sample or a y-direction of the sample, wherein in particular the position of the sample in at least the x-direction or y-direction is moved by an xy-stage on which the sample can be arranged.

In the context of the invention, a z-direction can be understood as a depth of the sample which lies on an optical axis of the capturing optics in the sample area. Accordingly, the x- and y-axes span a plane which is orthogonal to the optical axis in the sample area.

By changing the position in the z-direction, the merged microscope image can essentially correspond to a tomography. The individual layers can be displayed particularly sharply due to the defined depth of field areas.

The sample can be mapped by merging fused images in the x- and/or y-direction. It is possible that the entire sample is merged from fused images at least in the x-, y- or z-direction. This offers the advantage that the sample is then completely recorded in one or more directions and therefore a particularly large amount of information is available for evaluation.

In the context of the invention, it is also conceivable that the position of the sample in the second fused image differs from the position of the sample in the first fused image in the z-direction between 500 nm and 500 µm, in particular between 1 µm and 300 µm.

In other words, very thick samples can be measured for light microscopes. With thick samples, conventional light microscopes have the problem that the emissions from the planes that do not correspond to the focal plane add up and the merged image would be blurred. This is prevented by a method according to the invention, so that samples in the specified thickness ranges can also be captured with particularly high quality.

Within the scope of the invention, it is also conceivable that the depth of field of the individual captured fused images can be adjusted.

This allows the fusion effect to be optimally adapted to the current capturing situation. A greater depth of field allows more information to be obtained from the areas that are not exactly in the focal plane. This can prevent the information of an object from being cut off in the case of objects that are far apart on the z-plane if there is a large distance between the fused images to be merged or if the focal plane is not set exactly correctly. A shallow depth of field, on the other hand, ensures particularly sharp images and a good overview with small distances between the images to be merged in the z-direction.

In a method according to the invention, it is also conceivable that an output of the merged microscope image is also provided, whereby in particular a depth in the z-direction can be set during the output.

This allows the user to select the optimum depth of field depending on the situation. As described above, this value can vary, even within a sample. The customizability therefore always ensures an optimal user experience, which allows an accurate evaluation of the merged microscope image.

It is further conceivable in a method according to the invention that a recognition of a lens, which is configured at least for capturing the first image and the second image, is provided, wherein in particular a depth in the z-direction is set based on the recognition of the lens.

By adapting to the respective lens, the depth in the z-direction can be set that represents an optimum compromise between image sharpness and depth of field.

It is also conceivable in a method according to the invention that the microscopic capturing of the at least first fused image and the second fused image is carried out continuously.

The continuous capturing of the images to be fused offers the advantage that the capturings can be generated particularly quickly.

In the context of the invention, it is furthermore conceivable that a shading correction is provided when the at least first fused image and the second fused image are merged to form the merged microscope image.

Shading correction can achieve particularly good optical quality, especially at the transitions between two images to be merged.

It is also conceivable in a method according to the invention that at least the first fused image or the second fused image is displayed as a live image, whereby at least one depth in the z-direction can be set.

The live image allows the user to immediately check the effect of the depth setting in the z-direction and thus set the optimum value for the measurement. The immediate feedback effectively prevents a lengthy image capturing process from being started, where it only becomes apparent afterwards that the settings made were not optimal.

Preferably, in a method according to the invention, it is furthermore conceivable that at least:

a loading of a microscope slide into a microscope system,
an overview scan of the microscope slide,
a recording of a label information of the microscope slide,
a detection of the sample on the microscope slide,
a specification of image recording areas based on the detection of the sample
a definition of capturing parameters,
a microscopic preview capturing according to previously defined capturing parameters, in
particular a microscopic capturing according to the invention,
a microscopic capturing according to previously defined capturing parameters, in particular microscopic capturing according to the invention,
a creation of a focus map,
a moving of an xy-stage to the image recording areas, a correction of a lens defect,
a storing of at least the first image, the second image, the first fused image, the second fused image or the merged microscope image is provided
a moving of the xy-stage to the next sample or microscope slide.

By recording the label information, the microscope can be optimally adjusted before an image is captured. For example, the depth in the z-direction can be adapted to the label information. For example, the label may contain information about the thickness or type of sample, so that a certain depth is advantageous.

An overview scan of the sample can be understood as a microscopic capturing in which at least a lower resolution, fewer channels or a different channel, a larger image area or a lower magnification is used compared to the microscopic capturing. Such an overview scan allows the sample and the areas of interest for a high-resolution capturing to be quickly identified.

By moving the xy-stage to the next sample, the next sample can be picked up quickly. Furthermore, a next microscope slide, which in particular can also have one or more samples, can also be picked up in this way. It can also be provided that the next microscope slide is inserted into the xy-stage via a microscope slide mechanism.

Provision may be made for loading a microscope slide into a microscope system, overview scanning of the microscope slide, specifying image recording areas, defining capturing parameters, microscopic capturing, storing at least the first image, the second image, the first fused image, the second fused image or the merged microscope image, or moving the xy-stage to a next sample or a next microscope slide, in particular in the specified sequence.

According to a further aspect of the invention, there is provided a microscope system, in particular for carrying out a method according to the invention, comprising: an optical capturing device adapted to provide a microscopic capturing of at least a first fused image and a second fused image, comprising:

a camera and a lens configured to capture a first image and a second image,
a structured illumination device configured to illuminate the sample in a structured manner when the first image is captured,
a Gaussian illumination device adapted to uniformly illuminate the sample when the second image is captured, and
a computing device adapted to fuse the first image and the second image, wherein the first image is used for a low-frequency focus image information and the second image is used for a high-frequency focus image information, wherein the second fused image depicts a different position on the sample than the first fused image, and to merge the at least first fused image and the second fused image into the merged microscope image.

Thus, a microscope system according to the invention has the same advantages as those already described in detail with reference to a method according to the invention.

The structured illumination device can comprise at least one coherent light source, in particular a laser, or a diffuser, whereby the diffuser is irradiated by the light of the laser and generates a speckle pattern.

Furthermore, it may be provided that the diffuser is configured to be rotatable and, when illuminated by the Gaussian illumination device, is rotated to such an extent that a homogeneously illuminated image is captured on a time scale of the microscopic capturing. Such an arrangement allows the first image and the second image to be generated particularly quickly one after the other, so that the overall capturing time for the merged microscope image is greatly reduced.

According to a further aspect of the invention, there is provided a computer program product comprising instructions which, when the program is executed by a computer, in particular by a computing device of a microscope system according to the invention, cause the computer to execute a method according to the invention.

Thus, a computer program product according to the invention has the same advantages as those already described in detail with reference to a method according to the invention and/or a microscope system according to the invention.

BRIEF DESCRIPTION OF THE DRAWINGS

Further advantages, features and details of the invention are apparent from the following description, in which embodiments of the invention are described in detail with reference to the drawings. The features mentioned in the claims and in the description may be essential to the invention individually or in any combination. It shows schematically:

DETAILED DESCRIPTION

In the following description of some embodiments of the invention, the identical reference signs are used for the same technical features even in different embodiments.

Figure 1:
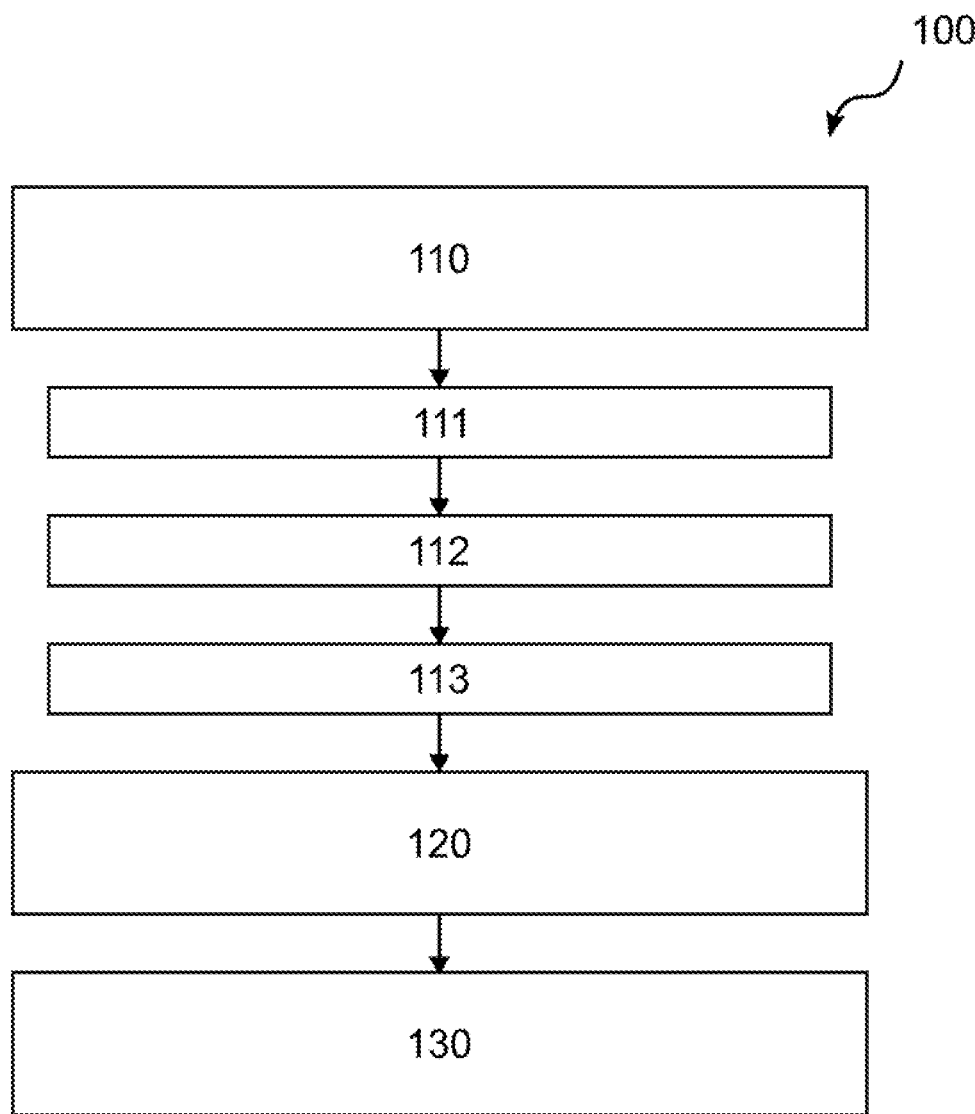
FIG. 1: A method according to the invention

FIG. 1 shows a method 100 for recording a merged microscope image 200 of a sample 300, comprising:

a microscopic capturing 110 of at least a first fused image 210 and a second fused image 220:

a capturing 111 of a first image 230, wherein the sample 300 is illuminated in a structured manner, a capturing 112 of a second image 240, wherein the sample 300 is uniformly illuminated, and a fusion 113 of the first image 230 and the second image 240, wherein the first image 230 is used for a low-frequency image information located in the focus and the second image 240 is used for a high-frequency image information located in the focus, wherein the second fused image 220 depicts a different position on the sample 300 than the first fused image 210, and a merging 120 of the at least first fused image 210 and the second fused image 220 into the merged microscope image 200.

Overall, the method 100 according to the invention achieves the advantage that a fast, inexpensive capturing with a particularly high optical quality, in particular image sharpness, is made possible with a simultaneously largest possible image section, in particular an entire sample 300. The merging of the first and second images 230, 240 means that images can be created very quickly in which the image information from the planes that are not in the focus of the lens 412 can be discarded, thereby increasing the sharpness of the image. Since this method does not require any scanning of the image, but only the capturing of two images 230, 240, it is particularly fast compared to scanning through the image as in a confocal microscope. By merging at least two, in particular several fused images 210, 220, the speed of the capturing can be used to string together several images and thus generate images 200 with a particularly large amount of information, for example segmented panoramas or high-resolution images with a large depth of field.

In addition, further steps/stages may be provided in a method according to the invention.

For example, an output 130 of the merged microscope image 200 may be provided, in particular on a screen. It may further be provided that, in particular, a depth in the z-direction, for which those image information from the merged microscope image 200 are discarded is adjustable during the output 130. In this way, a user can optimally adapt the depth to the evaluation and/or capturing requirements.

Figures 2, 3:
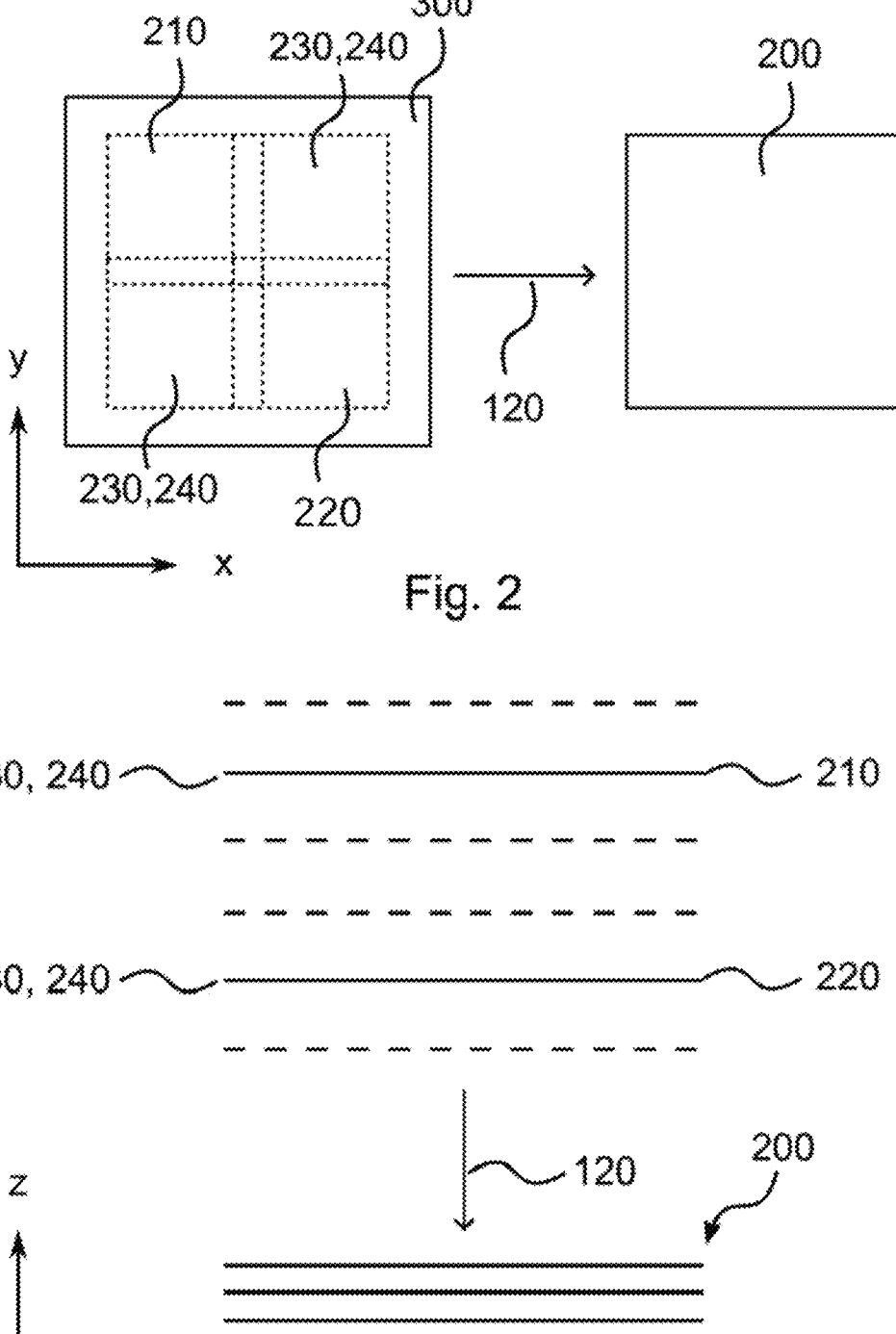
FIG. 2: An example of merging fused images.
FIG. 3: another example of merging fused images.

FIGS. 2 and 3 illustrate how the fused images 210, 220 may be merged 120.

FIG. 2 shows a top view of a sample 300. The dashed lines mark the points at which first and second fused images 210, 220 are captured. Each dotted square corresponds to a first image 230 and a second image 240, which are then merged 113. In other words, the microscope system 400 captures four times two images 230, 240 in the example shown. The fused images 210, 220 overlap in each case. The merging 120 of the fused images 210, 220 then produces the merged microscope image 200, which covers a much larger area of the sample 300 in the xy-plane than the individual fused images 210, 220. In particular, it may be provided that the entire sample 300 and/or preselected sections of the sample are covered by the merged microscope image 200.

FIG. 3 shows a further variation for merging 120 the fused images 210, 220. While in the example of FIG. 2 the position on the sample of the fused images 210, 220 varies in the xy-plane, in the example of FIG. 3 a variation in the z-plane is shown. In other words, fused images 210, 220 that vary in the z-axis, which is parallel to the optical axis of the capturing device 410 (see FIG. 4), can also be merged 120.

Shown by dashed lines is a depth in the z-direction for which that image information from the second image 240 is discarded which is not in a focus of the second image 240. It may be provided that this depth is adjustable. The distance between the fused images 210, 220 may be selected as shown in such a way that the fused images 210, 220 do not overlap in depth. It may also be provided that the fused images 210, 220 at least partially overlap in their depth.

Of course, merged microscope images 200 can also be provided by merging 120 fused images 210, 220, which vary in the xy-plane, as well as fused images 210, 220, which vary on the z-axis. As a result, a user of the microscope system 400 has a particularly large amount of image information available for evaluation, whereby the method 100 according to the invention creates the merged microscope image 200 very quickly despite the high information content.

Figure 4:
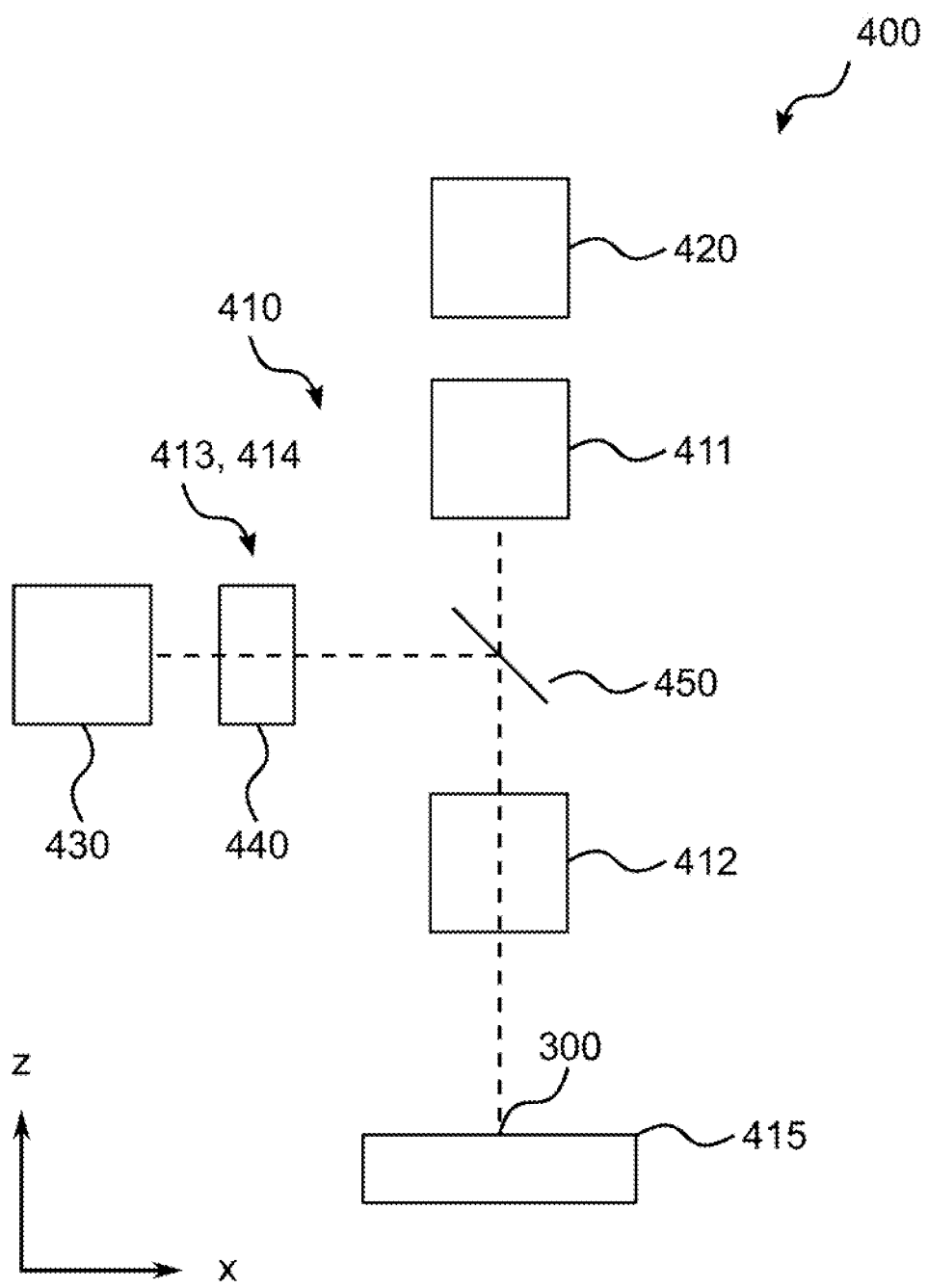
FIG. 4: A microscope system according to the invention.

FIG. 4 shows a microscope system 400, in particular for carrying out a method 100 according to the invention. The microscope system 400 comprises an optical capturing device 410 adapted to provide a microscopic capturing 110 of at least a first fused image 210 and a second fused image 220:

a camera 411 and a lens 412 adapted to capture 111 a first image 230 and a second image 240, a structured illumination device 413 adapted to illuminate the sample 300 in a structured manner when the first image 230 is captured, a Gaussian illumination device 414 adapted to uniformly illuminate the sample 300 when the second image 240 is captured, and a computing device 420 adapted to fuse 113 the first image 230 and the second image 240, wherein the first image 230 is used for a low-frequency, focus image information and the second image 240 is used for a high-frequency, focus image information, wherein the second fused image 220 depicts a different position on the sample 300 than the first fused image 210, and to merge the at least first fused image 210 and the second fused image 220 into the merged microscope image 200.

FIG. 4 shows the microscope system in a view of the x-z plane. Light is directed from a coherent light source 430 via a structured illumination device 413 and/or Gaussian illumination device 414 via a beam splitter 450 and a lens 412 onto the sample 300, which is located on a stage 415. The light reflected or fluorescing there is reflected back and, after passing through the beam splitter 450, falls into the camera 411. In the embodiment example shown, the structured illumination device 413 and the Gaussian illumination device 414 have a diffuser 440, which is configured to be rotatable. If the diffuser does not rotate, speckle illumination is generated by the structured illumination device 413 for capturing 111 a structurally illuminated image 230. If the diffuser 440 is set to rotate, a homogeneously illuminated image 240 can be captured 112. The control device 420 may control at least the capturing device 410, the camera 411, the lens 412, the structured illumination device 413, the Gaussian illumination device 414, the stage 415, the coherent light source 430 or the diffuser 440.

Thus, a microscope system 400 according to the invention has the same advantages as those already described in detail with reference to a method 100 according to the invention.

The structured illumination device 413 may comprise at least one coherent light source 430, in particular a laser, and a diffuser 440, wherein the diffuser 440 is irradiated by the light of the laser and generates a speckle pattern.

Furthermore, it may be provided that the diffuser 440 is configured to be rotatable and, when illuminated by the Gaussian illumination device 414, is rotated to such an extent that a homogeneously illuminated image is captured on a time scale of the microscopic capturing 110. Such an arrangement allows the structured and homogeneously illuminated image 230, 240 to be generated particularly quickly one after the other, so that the overall capturing time for the merged microscope image 200 is greatly reduced.

The foregoing explanation of the embodiments describes the present invention solely by way of examples. Of course, individual features of the embodiments may be freely combined with one another, provided that this is technically expedient, without departing from the scope of the present invention.

LIST OF REFERENCE SYMBOLS

100 Method
110 Capturing
111 Capturing a low-resolution image
112 Capturing a high-resolution image
113 Merging the low-resolution image and the high-resolution image
120 Merging the at least first fused image and the second fused image
130 Output
200 Microscope image 210 First fused image
220 Second fused image
230 First image
240 Second image
300 Sample
310 Microscope slide
400 Microscope system
410 Capturing device
411 Camera
412 Lens
413 Structured illumination device
414 Gaussian illumination device
415 Stage
420 Computing device
430 Coherent light source
440 Diffuser

The invention claimed is:

1. A method for recording a merged microscope image of a sample, comprising:
    a microscopic capturing of at least a first fused image and a second fused image:
    a capturing of a first image, wherein the sample is illuminated in a structured manner,
    a capturing of a second image, wherein the sample is uniformly illuminated, and
    a fusing of the first image and the second image, wherein the first image is used for a low-frequency image information located in the focus and the second image is used for a high-frequency image information located in the focus,
    wherein the second fused image depicts a different position on the sample than the first fused image, and
    merging the at least first fused image and the second fused image into the merged microscope image,
    wherein the method further comprises a recognition of a lens, which is configured at least for capturing the first image or for capturing the second image,
    wherein a depth in a z-direction is set based on the recognition of the lens,
    wherein a depth of field of the first fused image and the second fused image is adjusted.

2. The method according to claim 1, wherein the structured illumination during capturing of the first image is implemented at least as speckle illumination, periodic grid or checkerboard pattern.

3. The method according to claim 1, wherein the illumination when capturing the first and second image is configured as fluorescence illumination.

4. The method according to claim 1, wherein capturing of the first image and capturing of the second image is carried out with at least a first and a second color channel.

5. The method according to claim 1, wherein the position on the sample differs in at least the z-direction of the sample, an x-direction of the sample, or a y-direction of the sample.

6. The method according to claim 1, wherein the position of the sample in the second fused image differs from the position of the sample of the first fused image in the z-direction between 500 nm and 500 μm.

7. The method according to claim 1, wherein the depth of field of the individual captured fused images can be set.

8. The method according to claim 1, further comprising providing an output of the merged microscope image.

9. The method according to claim 1, wherein the microscopic capturing of at least the first fused image and of the second fused image is carried out continuously.

10. The method according to claim 1, comprising providing a shading correction when the at least first fused image and the second fused image are merged to form the merged microscope image.

11. The method according to claim 1, wherein at least the first fused image or the second fused image is displayed as a live image, at least one depth in the z-direction being adjustable.

12. The method according to claim 1, further comprising planning at least one of:

a loading of a microscope slide into a microscope system, an overview scan of the microscope slide, a recording of a label information of the microscope slide, a detecting of the sample on the microscope slide, a specification of image recording areas based on the detection of the sample a creation of a focus map, a moving of an xy-stage to the image recording areas, a correction of a lens defect, a storing of at least the first image, the second image, the first fused image, the second fused image or the merged microscope image, and a moving of the xy-stage to a next sample or a next microscope slide.

13. A microscope system for carrying out a method according to claim 1, the system comprising:

an optical capturing device adapted to provide microscopic capturing of at least a first fused image and a second fused image:

a camera and a lens adapted to capture a first image and a second image, a structured illumination device adapted to illuminate the sample in a structured manner when the first image is captured, a Gaussian illumination device adapted to uniformly illuminate the sample when the second image is captured, and a computing device adapted to fuse the first image and the second image, wherein the first image is used for a low-frequency, focus image information and the second image is used for a high-frequency, focus image information, wherein the second fused image depicts a different position on the sample than the first fused image, and merging the at least first fused image and the second fused image into the merged microscope image.

14. A computer program product comprising instructions which, when the program is executed by a computing device of a microscope system according to claim 13, cause the computer to execute the method.

15. The method according to claim 3, wherein the illumination has at least two color channels.

16. The method according to claim 4, wherein the sample is initially illuminated in a structured and homogeneous manner with the first color channel and then the sample is illuminated in a structured and homogeneous manner with the second color channel.

17. The method according claim 5, wherein the position of the sample in at least the x-direction or y-direction being moved by an xy-stage on which the sample can be arranged.

18. The method according to claim 8, wherein a depth in the z-direction can be set during the output.

* * * * *